United States Patent
Min et al.

[11] Patent Number: 5,976,657
[45] Date of Patent: Nov. 2, 1999

[54] OPTICAL RECORDING MEDIUM

[75] Inventors: Kyung-sun Min; Soo-hyung Lee, both of Yongin; Young-jae Huh, Sungnam, all of Rep. of Korea

[73] Assignee: Samsung Electronics Co., Ltd., Suwon, Rep. of Korea

[21] Appl. No.: 08/908,559

[22] Filed: Aug. 8, 1997

[30] Foreign Application Priority Data

Oct. 10, 1996 [KR] Rep. of Korea ...................... 96-45119
Jul. 7, 1997 [KR] Rep. of Korea ...................... 97-31318

[51] Int. Cl.$^6$ ...................................................... B23B 3/00
[52] U.S. Cl. ...................... 428/64.1; 428/64.4; 428/64.7; 428/457; 428/913; 430/270.12; 430/495.1; 430/945; 369/275.1; 369/283; 369/288
[58] Field of Search .................................. 428/64.1, 64.2, 428/64.4, 64.7, 457, 913; 430/270.12, 495.1, 945; 369/275.1, 275.4, 283, 288

[56] References Cited

U.S. PATENT DOCUMENTS

| | | |
|---|---|---|
| 4,398,203 | 8/1983 | Cornet . |
| 4,920,359 | 4/1990 | Arai et al. . |
| 4,940,618 | 7/1990 | Hamada et al. . |
| 4,973,520 | 11/1990 | Takada et al. . |
| 4,983,440 | 1/1991 | Ikeda et al. . |
| 4,990,388 | 2/1991 | Hamada et al. . |
| 5,009,818 | 4/1991 | Arai et al. . |
| 5,020,048 | 5/1991 | Arai et al. . |
| 5,039,558 | 8/1991 | Imai et al. . |
| 5,080,946 | 1/1992 | Takagisi et al. . |
| 5,090,008 | 2/1992 | Clark et al. . |
| 5,090,009 | 2/1992 | Hamada et al. . |
| 5,115,424 | 5/1992 | Nakajima et al. .................. 369/275.4 |
| 5,155,723 | 10/1992 | Hamada et al. . |
| 5,213,955 | 5/1993 | Hamada et al. . |
| 5,216,665 | 6/1993 | Imataki ..................................... 369/279 |
| 5,318,882 | 6/1994 | Ootaguro et al. . |
| 5,328,813 | 7/1994 | Strandjord et al. . |
| 5,398,231 | 3/1995 | Shin et al. . |
| 5,406,546 | 4/1995 | Uchiyama et al. .................. 369/275.4 |
| 5,407,719 | 4/1995 | Hamada et al. . |
| 5,409,756 | 4/1995 | Ikeda et al. . |
| 5,728,441 | 3/1998 | Min et al. .............................. 428/64.1 |

FOREIGN PATENT DOCUMENTS

| | | |
|---|---|---|
| 0 130 329 A1 | 1/1985 | European Pat. Off. . |
| 0 317 696 | 5/1989 | European Pat. Off. . |
| 0 474 311 A1 | 3/1992 | European Pat. Off. . |
| 0 536 406 | 4/1993 | European Pat. Off. . |
| 0 777 224 | 6/1997 | European Pat. Off. . |
| 63-268142 | 11/1988 | Japan . |

OTHER PUBLICATIONS

Patent Abstracts Of Japan, vol. 15, No. 192 (P–1202), May 17, 1991 & UJP 03 046136 A (Toppan Printing), Feb. 27, 1991.

Patent Abstracts Of Japan, vol. 14, No. 494 (P–1123), Oct. 26, 1990 & JP 02 201748 A (Matsushita), Aug. 9, 1990.

*Primary Examiner*—Elizabeth Evans
*Attorney, Agent, or Firm*—Burns, Doane, Swecker & Mathis, L.L.P.

[57] ABSTRACT

In the optical recording medium including a substrate having pregrooves, and a metal recording layer, a buffering layer, a reflecting layer and a protecting layer which are sequentially stacked on the substrate, an angle (θ) of the slanted side of the pregrooves is 30~90° and the buffering layer has 10~50,000 Pa.S melt-viscosity at 140° C. Therefore, the optical recording medium can be compatible with a CD and playable by a DVDP, and manufactured at low costs without using a dye, while providing a high reflectivity at longer wavelength than 600 nm.

21 Claims, 2 Drawing Sheets

OPTICAL RECORDING MEDIUM

BACKGROUND OF THE INVENTION

The present invention relates to an optical recording medium, and more particularly, to an optical recording medium which is compatible with compact discs (CD's), has a high reflectivity at wavelengths longer than 600 nm, and in and from which information can be recorded and reproduced by a digital versatile disc player (DVDP) and a compact disc player (CDP), and further can be produced at low costs.

The recording area per recording unit of an optical recording medium is smaller than that of a conventional magnetic recording medium, so that the optical recording medium has been used as a high density recording medium. Optical recording mediums are classified into the following types: read only memory (ROM) type which only reproduces already recorded information, write once read many (WORM) type which is recordable just once and readable many times, and rewritable type which is recordable, erasable and rewritable medium. The information recorded in the optical recording medium should be reproduced by a player for the ROM type medium. To this end, the optical recording medium must satisfy a conventional standardization rules (RED BOOK), that it have a reflectivity of 65% or more and carrier-to-noise ratio (CNR) of 47 dB or more.

In a recordable optical recording medium, the recorded information can be reproduced based on the change of the reflectivity which is caused by a physical modification, phase change or change of a magnetic property in a recording layer before and after the recording. Also, for making the optical recording medium compatible with CD's, a long-term data storing property and a high recording density are required as well as the above high reflectivity and CNR characteristic. In order to improve the characteristic of the optical recording medium and make the manufacturing process easily, various optical recording media being formed of various materials have been suggested, and a group of them is in practical use.

As a conventional optical recording medium, Japanese Laid-open Patent Publication No. showha 63-268142 discloses a recording medium having a structure in which a sensitizing layer formed of gelatin, casein or polyvinyl alcohol (PVA), and a metal thin film as a recording layer formed of chromium (Cr), nickel (Ni) or gold (Au) are sequentially stacked on a substrate. According to the optical recording principle of the recording medium, the metal thin film absorbs heat of an irradiated laser beam, and thus the sensitizing layer and the metal thin film are deformed to form a recording pit. However, the recording pit of this recording medium is exposed so that it is difficult to store the recorded information for a long-term.

U.S. Pat. No. 4,973,520 discloses a recording medium having a structure in which three metal thin films are stacked on a substrate. The recording characteristic of the recording medium is good. However, the long-term storage of the recorded information cannot be achieved due to its exposed recording pits.

In order to solve the above defect, U.S. Pat. No. 4,983,440 discloses a recording medium having a structure in which two metal thin films which act as a recording layer, and a protecting layer for protecting the recording layer are sequentially stacked on a substrate. However, this recording medium has a very low reflectivity of about 20% and requires a high-power light source for the practical use. Also, the recording medium cannot be compatible with a conventional CD.

According to U.S. Pat. No. 5,328,813, a metal thin film as a recording layer is formed on a substrate, and a hard metal oxide layer is formed on the metal thin film to increase an information storing property and the reflectivity to 40~69%. However, the CNR is still low.

Also, U.S. Pat. No. 5,155,723 discloses a recording medium having a structure in which an organic dye layer as a recording layer is stacked on a substrate, and a reflecting layer and a protecting layer are stacked on the recording layer. According to the recording medium, the dye layer absorbs a recording laser beam for a recording to emit heat. Also, the substrate is heated and deformed by the heating, so that a recorded signal can be reproduced based on the difference of the reflectivity according to the recording. Here, the reflectivity of the recording medium is 70% or more and the CNR after recording is 47 dB or more to be compatible with the CD. However, the recording layer of the recording medium has low resistance against heat and light, and the manufacturing costs are high due to the use of expensive organic dye. Also, a spin coating is performed during the manufacturing process with an organic dye solution. However, the thickness of the coating layer must be accurately controlled with a deviation of ±3% or less during the manufacturing of an optical disc since the reflectivity is dependent on the thickness of the coating layer. Also, costly equipment is required and productivity is low.

SUMMARY OF THE INVENTION

To solve the above problems, it is an object of the present invention to provide an optical recording medium capable of being compatible with compact discs (CD's), providing high productivity at low costs.

To achieve this and other objects, there is provided an optical recording medium comprising a substrate having pregrooves, and a metal recording layer, a buffering layer and a reflecting layer which are sequentially stacked on the substrate, wherein the angle (θ) of the slant side of the pregroove is 30~90° and the buffering layer has 10~50,000 Pa.S melt-viscosity at 140° C.

Preferably, width at the bottom of the pregroove is 10~450 nm, width at the uppermost of the pregroove is 400~1,000 nm, and depth of the pregroove is 30~450 nm.

Preferably, the buffering layer is formed of at least one resin having 70~130° C. glass transition temperature (Tg), selected from the group consisting of vinylalcohol resin, vinylacetate resin, acrylate resin, polyester resin, polyether resin, polystyrene resin, polyurethane resin, cellulose resin, fatty acid resin and copolymers thereof. Also, the buffering layer may include a dye having a high reflectivity at an available wavelength region for the optical recording medium. Here, the dye content is 30 wt % or less based on the weight of the buffering layer.

Hereinafter, the structure and characteristics of an optical recording medium according to a preferred embodiment of the present invention will now be described with reference to the appended drawings.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
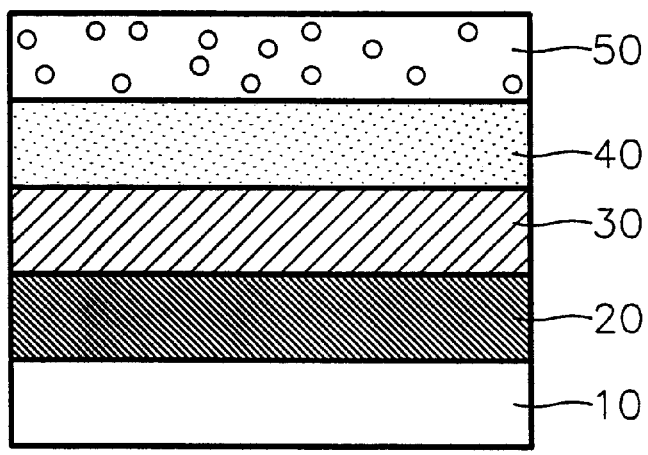
FIG. 1 is a sectional view showing the structure of an optical disc according to a preferred embodiment of the present invention.

Referring to FIG. 1 showing the structure of an optical recording medium according to a preferred embodiment of the present invention, the optical recording medium includes a substrate 10, and a metal recording layer 20, a buffering layer 30, a reflecting layer 40 and a protecting layer 50 which are sequentially stacked on the substrate 10.

In the optical recording medium having the above structure, the metal recording layer 20 is heated by a laser beam during optical recording, and the heat is transferred to the substrate 10 and the buffering layer 30. A region of the substrate 10, adjacent to the heated region of the metal recording layer 20, is expanded and deformed, and the heated region of the metal recording layer 20 is swelled out toward the buffering layer 30 by the expanding force of the substrate 10.

Figure 2:
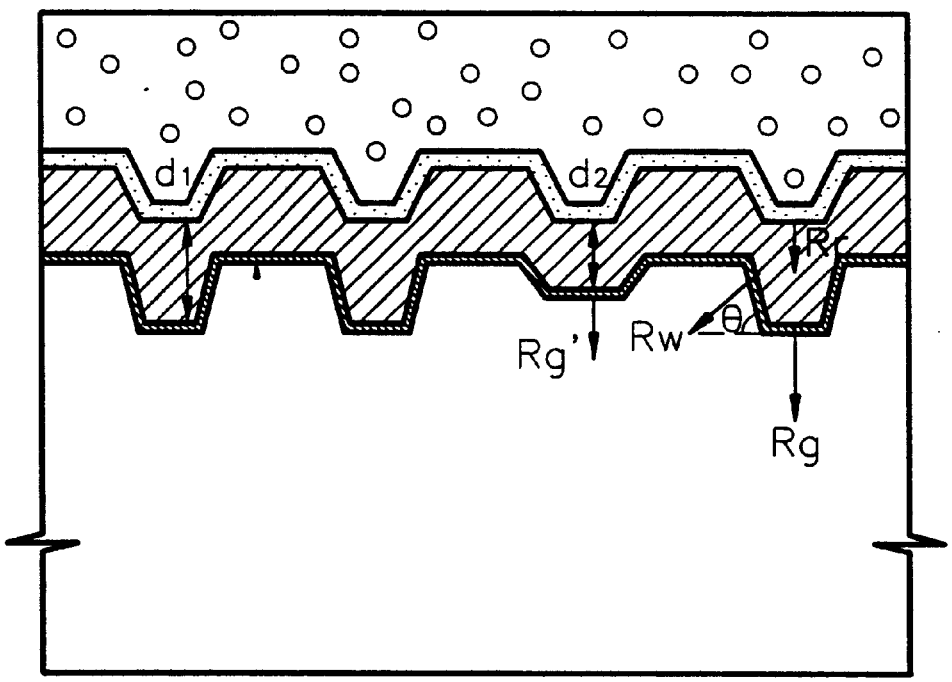
FIG. 2 is a sectional view showing a recorded portion and a non-recorded portion formed in the optical disc of FIG. 1.

FIG. 2 is a sectional view showing a recorded portion and a non-recorded portion in detail, which are formed in the optical recording medium according to the present invention. As shown in FIG. 2, in the recorded portion, the substrate 10 is swelled up and the buffering layer 30 is deformed by heat, so that the reflecting layer 40 may be also deformed. Here, the degree of deformation is proportional to the heat generated from the metal recording layer 20 and dependent on the materials and thickness of the metal recording layer 20 and the buffering layer 30.

In the optical recording medium of the present invention, the reflectivity of the recorded portion increases during recording compared with the non-recorded portion by the following principles.

Figure 3:
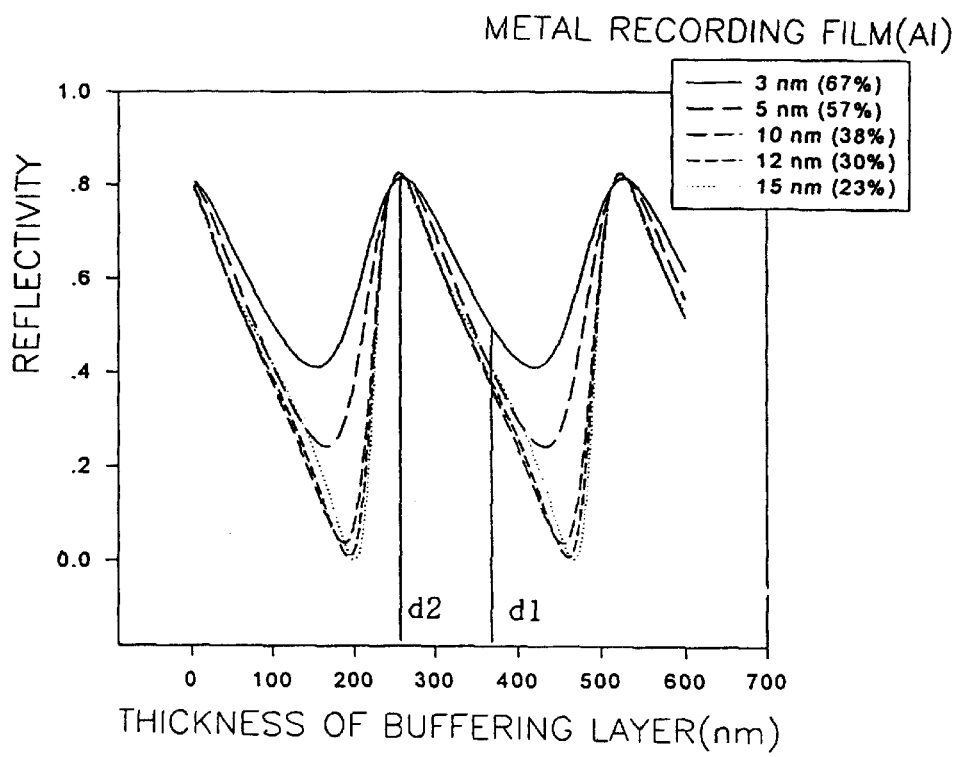
FIG. 3 is a graph showing the change of reflectivity according to the thickness of a buffering layer of the optical disc of FIG. 1.

First, as shown in FIG. 2, the thickness of the buffering layer 30 becomes thin from $d_1$ to $d_2$ by the expansion of the substrate 10 during the recording. Here, the reflectivity is varied according to the thickness of the buffering layer 30 as shown in FIG. 3, so that the reflectivity increases by the decrease of the thickness of the buffering layer 30. That is, the initial thickness $d_1$ of the buffering layer 30 is decreased to $d_2$ by the recording, so that the reflectivity is increased after the recording. Here, the amount of increased reflectivity depends on the thickness of the metal layer 20.

Second, bottom of the pregrooves 60 in the substrate 10 is expanded by the expansion of the substrate 10 during the recording, so that the width of the pregrooves 60 is decreased, thereby reducing a reflective light Rw scattered from the sidewalls of the pregrooves 60. On the contrary, a reflective light Rr reflected As from the bottom of the reflecting layer 40 or a reflective light Rg reflected from the bottom of the pregrooves 60 are increased. Accordingly, the reflectivity increases after the recording.

Third, the degree of transmittance of the recorded portion of the metal recording layer 20 increases. That is, the center of the recorded portion greatly expands, so that the thickness of the center of the metal recording layer 20 may become thin or a hole may be formed therein, thereby increasing the reflectivity at the recorded portion.

According to the optical recording medium of the present invention, the size and shape of the pregrooves 60 of the substrate and material of the buffering layer 30 are coordinated in order to increase the recording characteristic such as CNR, cross-talk or jitter, based on the above-described principles for increasing the reflectivity at the recorded portion.

That is, the material of the buffering layer 30 is pushed toward a land 70 by the expansion of the substrate 10, thereby changing the shape of the land 70. Here, the change in shape of the land 70 acts as noise of a recorded signal to increase the jitter. To prevent the jitter, the angle ($\theta$, FIG. 2) of a slanted side of the pregroove 60 should be controlled to 30°~90°, preferably, near 90°, and the bottom area of the pregroove 60 should be increased. Also, appropriate viscosity should be provided to the buffering layer 30 to prevent the buffering layer 30 from being pushed out.

Also, the metal recording layer 20 formed of a metal having a light absorption at the laser wavelength generates heat during the recording to heat the substrate 10 and the buffering layer 30, thereby deforming the substrate 10 and the buffering layer 30. On the other hand, the recorded information is reproduced by a reflective light Rg' being reflected from the metal recording layer 40. Thus, preferably, the metal recording layer 30 is formed of a metal having a high reflectivity, a high absorption coefficient for sufficient emission and a low thermal conductivity. More preferably, a metal having a coefficient k of the imaginary part of a complex refractive index, which is greater than or equal to 0.01, is used. (Here, the refractive index means a complex refractive index expressed by "n-ki", wherein n is a coefficient of the real part and k is a coefficient of the imaginary part, and k=0 at a wavelength without absorption).

Hereinafter, characteristics required for each constituent layer of the optical recording medium according to the present invention will be described in detail.

In one surface of the substrate 10 of the optical recording medium according to the present invention, pregrooves 60 for guiding light during the recording are formed, wherein the shape of the pregrooves 60 acts as a factor affecting the reflectivity and a tracking characteristic.

Preferably, the initial depth of the pregrooves 60 is 30~450 nm. If the depth of the pregrooves 60 is 30 nm or less, the depth of the pregrooves 60 reflected in the buffering layer 30 (groove image) is small, so that the difference of the reflectivity between the land side and the pregroove side is decreased, thereby making unstable tracking. On the contrary, if the depth of the pregrooves 60 is 450 nm or higher, a boundary between the buffering layer 30 and the reflecting layer 40 is largely dented at the pregrooves 60 side (deep groove image), causing the scattering of the light. Accordingly, the reflectivity before the recording is very low, so that the recording itself is impossible.

Also, preferably, the width of the bottom of the pregrooves 60 is 100~450 nm and that of the uppermost of the pregrooves 60 is 400~1,000 nm. Also, the angle ($\theta$) of the slanted side of the pregrooves 60 is preferably 30°~90°, more preferably, near 90°. In order to prevent the easy deformation of the pregrooves 60 by the expansion of the substrate 10 and reduce noise of a recorded signal, the sides of the pregrooves 60 should be nearly orthogonal with respect to the bottom and the bottom area of the pregrooves 60 should be wide e.g., 10~450 nm.

Preferably, as a material for the substrate 10, polycarbonate, polymethylmethacrylate (PMMA), epoxy resin, polyester or amorphous polyolefin is used, which is transparent with respect to a laser beam and capable of being expanded and deformed by heat, and has excellent impact intensity and glass transition temperature (Tg) of 80~120° C., more preferably, 100~200° C.

The metal recording layer 20 of the optical recording medium according to the present invention acts as a heat generating layer by absorption of a recording laser beam and a partial mirror for providing a contrast difference before and after recording. Thus, it is preferable that the metal recording layer 20 have a 30~300 Å thickness, 5~95% transmittance and 5~95% reflectivity. If the thickness thereof is 30 Å or less, amount of heat generated by the light absorption for the recording is not sufficient to deform the substrate 10. On the contrary, if the thickness thereof exceeds 300 Å, the expansion of the substrate 10 for the recording is hindered by the metal recording layer 20, so that the recorded portion is less deformed. As the metal recording layer 20 becomes thick, a great reflection occurs at the metal recording layer 20 to scatter the light. Accordingly, it is difficult to obtain a high reflectivity. Also, preferably, the thermal conductivity of the metal recording layer 20 should be 4W/cm° C. or less. If the thermal conductivity of the metal recording layer 20 exceeds 4W/cm° C., the recording layer 20 heated by a laser beam cannot contain the heat while the heat of the recording layer 20 is rapidly transferred to the surrounding material so that it is difficult to heat the recording layer 20 to a required temperature or more. Even though the recording layer 20 is heated to the intended temperature, adjacent tracks may be deformed since the size of the recording pit is increased. Also, it is preferable that the thermal linear expansion coefficient of the metal recording layer 20 is equal to or higher than $3\times10^{-6}/°$ C. If the linear expansion coefficient is less than the level, the metal recording layer 20 is cracked by the expansion caused by the deformation of the substrate 10 for the recording, so that a good recorded signal value cannot obtained. The metal recording layer may be formed of gold (Au), aluminum (Al), chromium (Cr), palladium (Pd), titanium (Ti), copper (Cu), nickel (Ni), platinum (Pt), silver (Ag), tantalum (Ta), iron (Fe) or alloys thereof using a vacuum deposition, electron beam or sputtering method.

The buffering layer 30 does not absorb very much of the recording light and buffers the expansion force of the substrate 10 to decrease the deformation of the reflecting layer 40. The buffering layer 30 consists of a material capable of being easily deformed and having an appropriate fluidity, as a layer absorbing the deformation of the substrate 10 and the metal recording layer 20.

Thus, preferably, a melt-viscosity of the material for the buffering layer 30 at 140° C. is 10~50,000 Pa.S. If the melt-viscosity is 10 Pa.S or less, the buffering layer 30 is seriously deformed by the expansion of the substrate 10, causing a great deformation at the land side 70 thereof to make inferior a recorded signal. On the contrary, the melt-viscosity exceeds 50,000 Pa.S, the buffering layer 30 cannot perform its own buffering function.

Also, preferably, a glass transition temperature (Tg) of the material of the buffering layer 30 is 70~130° C., more preferably, lower than a glass transition temperature of the substrate 10. If the glass transition temperature (Tg) of the buffering layer 30 is 70° C. or lower, the long-term stability of data is deteriorated. On the contrary, if the glass transition temperature (Tg) thereof is 130° C. or more, the deformation of the substrate 10 is hindered, lowering a recording sensitivity.

The buffering layer 30 includes at least one material selected from the group consisting of vinylalcohol resin, vinylacetate resin, polyester resin, polyether resin, polystyrene resin, polyurethane resin, cellulose resin and fatty acid resin.

Also, the buffering layer 30 may include a material having a high refractive index, e.g., dye, to increase the contrast after the recording. Here, preferably, the dye content is 30 wt % or less. If the dye content exceeds 30 wt %, the reflectivity is decreased by the absorption of the light and loss in economic aspect is caused. Generally, the buffering layer 30 is formed by dissolving the material for the buffering layer 30 in an organic solvent and then spin-coating the solution. Here, it is essential to use the organic solvent capable of easily dissolving the material for the buffering layer without damage to the substrate 10.

As shown in FIG. 3, preferably, the thickness of the buffering layer 30 is set to $d_1$ to provide 40% or more reflectivity, e.g., 50~1,000 nm.

The reflecting layer 40 is formed of a metal selected from the group consisting of Au, Al, Ag, Cu, Pd, Pt, Ti, Ta, Cr, Ni, Fe and alloys thereof, preferably, a metal selected from the group consisting of Au, Al, Cu, Cr and alloys thereof, to a thickness of 50~1,500 Å by a vacuum deposition or sputtering method.

The protecting layer 50 protects other constituent layers of the optical recording medium. The protecting layer 50 is formed by a general method. For example, the protecting layer 50 is formed by spin-coating an epoxyacrylate resin which is transparent and curable by ultraviolet rays, and has a great impact intensity, and then curing the spin-coated product by irradiating ultraviolet rays.

According to the optical recording medium of the present invention, having the above structure, a heat generating portion which generates heat by absorbing a laser beam is limited to the metal recording layer 20, so that the recording characteristic and productivity are improved by the combined characteristics of the pregroove 60 of the substrate 10 and the buffering layer 30, without using a dye. Also, the optical recording medium can be compatible with the CD due to its high reflectivity at the wavelength of 600 nm or higher.

Hereinafter, the present invention will be described in detail with reference to the following examples. However, the present invention is not limited to the following examples.

EXAMPLE 1

An aluminum (Al) recording layer 20 was vacuum-deposited to a 10 nm thickness on a polycarbonate (PC) substrate 10 with 1.2 mm thickness having pregrooves 60 with 153 nm depth, 0.5 μm width at the uppermost portion thereof, 0.25 μm width at the bottom thereof, 50° angle (θ) at the slanted side thereof and 1.6 μm track pitch. Then, a coating solution obtained by dissolving 0.9 g polymethylmethacrylate (PMMA, MW=9,000, melt-viscosity =20,000 Pa.S at 140° C.) in 10 ml diacetone alcohol (DAA) was spin-coated on the Al recording layer 20 at 2,000 rpm to form a buffering layer 30. Here, the thickness of the buffering layer 30 corresponding to the pregrooves 60 side, measured by a scanning electron microscope (SEM), was about 220 nm. After drying the resultant structure at 40° C. in a vacuum oven, Al was vacuumdeposited to about 1,000 Å to form a reflecting layer 40. Then, an ultraviolet (UV)-curable epoxyacrylate resin was spin-coated on the reflecting layer and then cured to form a protecting layer 50, resulting in a disc type optical recording medium according to the present invention.

Figure 4:
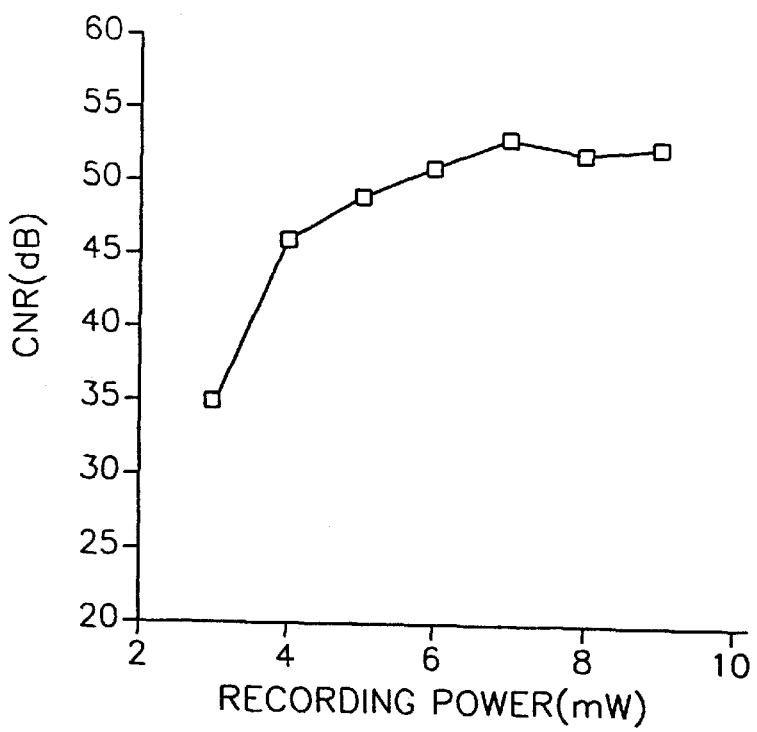
FIG. 4 is a graph showing the change of CNR according to recording power in the optical disc of FIG. 1.

According to the result of the evaluation on the obtained disc, using an evaluation equipment adopting 780 nm laser beam, reflectivity before the recording was 45%, and the maximum reflectivity $R_{top}$ was 66% and the CNR was 55 dB using 0.7 mW recording laser power with respect to a disc which was recorded at 1.3 m/sec recording speed using 8 mW recording power, 720 kHz modulation. Under the above recording conditions, a recorded signal of 47 dB or more CNR was reproduced at 4 mW or more recording power as shown in FIG. 4. Also, after recording an audio signal in the disc using a CD-R recorder (RPD-1000, Pioneer), the recorded audio signal could be reproduced using a CD player (Mark II, Philips). According to the recording characteristics of the disc, evaluated by a CD-CATS (Audio Development Co., Sweden), the evaluated all items satisfied the standard of the CD. Also, the reflectivity of the disc was 54% at the wavelength of 650 nm, and information recorded in the disc could be reproduced by a digital versatile disc player (DVDP).

EXAMPLE 2

A disc type optical recording medium was manufactured by the same method as that of Example 1, except that the material of the metal recording layer 20 was replaced by CuAl with 11 nm thickness, and the performance of the disc was evaluated.

The reflectivity before the recording was 47%, and the average reflectivity and the maximum reflectivity $R_{top}$ were 59% and 66%, respectively, and the CNR was 57 dB using 0.7 mw recording laser power with respect to a disc which was recorded at 1.3 m/sec recording speed using 8 mW recording power, 720 kHz modulation. Also, after recording an audio signal in the disc using a CD-R recorder (RPD-1000, Pioneer), the recorded audio signal could be reproduced using a CD player (Mark II, Philips). According to the recording characteristics of the disc, evaluated by a CD-CATS (Audio Development Co., Sweden), the evaluated all items satisfied the standard of the CD. Also, the reflectivity of the disc was 51% at the wavelength of 650 nm, and information recorded in the disc could be reproduced by a DVDP.

EXAMPLE 3

A disc type optical recording medium was manufactured by the same method as that of Example 1, except that 0.5 wt % dye (Red CV-S 300, ICI Co., refractive index (n)=2.2 at 780 nm) was added to a buffering layer 30.

The reflectivity before the recording was 43%, and the average reflectivity and the maximum reflectivity $R_{top}$ were 59% and 65%, respectively, and the CNR was 59 dB using 0.7 mW recording laser power with respect to a disc which was recorded at 1.3 m/sec recording speed using 8 mW recording power, 720 kHz modulation. Under the above recording conditions, a recorded signal of 47 dB or more CNR was reproduced at 4 mW or more recording power as shown in FIG. 4. Also, after recording an audio signal in the disc using a CD-R recorder (RPD-1000, Pioneer), the recorded audio signal could be reproduced using a CD player (Mark II, Philips). According to the recording characteristics of the disc, evaluated by a CD-CATS (Audio Development Co., Sweden), the evaluated all items satisfied the standard of the CD. Also, the reflectivity of the disc was 47% at the wavelength of 650 nm, and information recorded in the disc could be reproduced by a DVDP.

EXAMPLE 4

A disc type optical recording medium was manufactured by the same method as that of Example 1, except that a substrate 10 having pregrooves 60 with 250 nm depth, 0.6 µm width at the uppermost portion thereof, 0.3 µm width at the bottom thereof, 61° angle at the slant side thereof was used and a coating solution was prepared by dissolving 1.3 g polymethylmethacrylate (PMMA, MW=9,000, melt-viscosity =20,000 Pa.S at 140° C.) in 10 ml diacetone alcohol (DAA). A music recorded in the disc using a CD-R recorder could be reproduced by a CDP and a DVDP. The maximum reflectivity $R_{top}$ at 780 nm was 71%, and the reflectivity at 650 nm was 51%.

Comparative Example 1

A dye solution obtained by dissolving 4.4 g N,N'-2,5-cyclohexadien-1,4-diylidenbis[4-(dibutylamino)-N-[4-(dibutylamino) phenyl]-bis[(OC-6-11)-hexafluoro-antimonate(10)](NK-3219, Nippon Kanko Shinko Kenkusho CO., Ltd., $\lambda_{max}$=720 nm) in 100 ml DAA was deposited on the same substrate 10 as Example 1 using a spin coater at 50 rpm for 5 seconds, 1,500 rpm for 15 seconds, and 4,000 rpm at 30 seconds in sequence, and then fully dried. Then, an Au reflecting layer was formed to 100 nm thickness using a sputter. After depositing a UV-curable resin on the Au reflective layer, the resultant structure was cured by irradiating UV to form a protecting layer with 10 µm thickness. The maximum reflectivity $R_{top}$ was 66%, and the CNR was 65 dB using 0.7 mW recording laser power with respect to a disc which was recorded at 1.3 m/sec recording speed using 8mW recording power, 720 kHz modulation. However, the reflectivity at 650 nm was 15%, so that the disc could not be played by a DVDP.

Comparative Example 2

A disc type optical recording medium was manufactured by the same method as Example 1, except that pregrooves 60 of the substrate have 90 nm depth, 0.6 µm width at the uppermost portion thereof, 0.08 µm width at the bottom thereof, 19° angle at the slant side thereof and 1.6 µm track pitch. According to the result evaluated by using an evaluation equipment (Apex), the reflectivity before the recording was 50%, and the CNR and the average reflectivity was 50 dB and 66%, respectively, after the recording at 1.3 m/sec recording speed using 8 mW recording power. After recording using EFM, a clean eye pattern could not be observed due to the serious deformation at the land side, and the playback after recording an audio signal was impossible.

Comparative Example 3

A disc type optical recording medium was manufactured by the same method as Example 1, except a buffering layer 30 was formed using 0.6 g PMMA (MW=38,000, melt-viscosity=200,000 Pa.S at 140° C.), and the recording was performed under the same condition as Example 1. The reflectivity before the recording was 52%, and the average reflectivity after the recording and the CNR were 55% and 45 dB, respectively. Also, the pattern was not clean, and the playback was impossible after recording an audio signal using a CD-R recorder.

As described above, the optical recording medium of the present invention can be compatible with a CD, and information recorded in the optical recording medium can be reproduced by a DVDP due to its high reflectivity at 650 nm or higher. Also, a dye is scarcely used, so that the manufacturing costs are lowered with high productivity.

The present invention has been described by way of exemplary embodiments to which is not limited. Variations and modifications to the exemplary embodiments will occur to those skilled in the art which do not depart from the spirit and scope of the present invention as identified in the claims attached thereto.

What is claimed is:

1. An optical recording medium comprising:
   a substrate having pregrooves;
   a metal recording layer;
   a buffering layer;
   a reflecting layer which are sequentially stacked on the substrate; and
   a protecting layer on the reflecting layer,
   wherein the angle (Θ) of a slanted side of the pregrooves is 30–90° relative to a plane of the substrate and the buffering layer has 10–50,000 Pa.S melt-viscosity at 140° C.

2. The optical recording medium of claim 1, wherein the reflectivity of the optical recording medium is 40% or more at 600–800 nm.

3. The optical recording medium of claim 1, wherein the substrate is formed of one resin selected from the group consisting of polycarbonate resin, polymethylmethacrylate resin, epoxy resin, polyester resin and amorphous polyolefin resin.

4. The optical recording medium of claim 3, wherein a glass transition temperature (Tg) of the substrate is 80–200° C.

5. The optical recording medium of claim 4, wherein a glass transition temperature (Tg) of the substrate is 100–200° C.

6. The optical recording medium of claim 1, wherein a reflectivity of the optical recording medium increases after recording.

7. The optical recording medium of claim 1, wherein at least one of the substrate and the metal recording layer, and the buffering layer has a deformed portion.

8. The optical recording medium of claim 7, wherein the substrate and the metal recording layer have the deformed portion, and a portion of the buffering layer corresponding to the deformed portion has a reduced thickness.

9. The optical recording medium of claim 7, wherein the substrate and the metal recording layer, and the buffering layer have the deformed portions corresponding to each other.

10. The optical recording medium of claim 9, wherein the reflecting layer has a deformed portion corresponding to the deformed portion of the buffering layer.

11. The optical recording layer of claim 1, wherein the buffering layer 30 has a thickness of 50–1,000 nm.

12. The optical recording medium of claim 1, wherein the glass transition temperature (Tg) of the buffering layer is 70–130° C.

13. The optical recording medium of claim 12, wherein the buffering layer comprises at least one resin selected from the group consisting of vinylalcohol resin, vinylacetate resin, acrylate resin, polyester resin, polyether resin, polystyrene resin, polyurethane resin, cellulose resin, fatty acid resin and copolymers thereof.

14. The optical recording medium comprising:
   a substrate 10 having pregrooves;
   a metal recording layer;
   a buffering layer; and
   a reflecting layer which are sequentially stacked on the substrate,
   wherein the angle (Θ) of a slanted side of the pregrooves is 30–90° relative to a plane of the substrate and the buffering layer has 10–50,000 Pa.S melt-viscosity at 140° C., and wherein the thickness of the metal recording layer is 30–300 Å and a coefficient k of the imaginary part of a complex refractive index is greater than or equal to 0.01.

15. The optical recording medium of claim 14, wherein the metal recording layer is formed of a metal having 4W/cm° C. or less thermal conductivity.

16. The optical recording medium of claim 15, wherein the metal comprises one material selected from the group consisting of gold (Au), aluminum (Al), chromium (Cr), palladium (Pd) titanium (Ti), copper (Cu), nickel (Ni), platinum (Pt), silver (Ag), tantalum (Ta), iron (Fe) and alloys thereof.

17. The optical recording medium comprising:
   a substrate having pregrooves;
   a metal recording layer;
   a buffering layer; and
   a reflecting layer which are sequentially stacked on the substrate,
   wherein the angle (Θ) of a slanted side of the pregrooves is 30–90° relative to a plane of the substrate and the buffering layer has 10–50,000 Pa.S melt-viscosity at 140° C., and wherein a width at the bottom of the pregrooves is 10–450 nm, a width at an uppermost part of the pregrooves is 400–1,000 nm, and a depth of the pregrooves is 30–450 nm.

18. The optical recording medium comprising:
   a substrate having pregrooves;
   a metal recording layer;
   a buffering layer; and
   a reflecting layer which are sequentially stacked on the substrate,
   wherein the angle (Θ) of a slanted side of the pregrooves is 30–90° relative to a plane of the substrate and the buffering layer has 10–50,000 Pa.S melt-viscosity at 140° C., and wherein the buffering layer includes a dye of 30 wt % or less based on the weight of the buffering layer.

19. The optical recording medium comprising:
   a substrate having pregrooves;
   a metal recording layer;
   a buffering layer; and
   a reflecting layer which are sequentially stacked on the substrate,
   wherein the angle (Θ) of a slanted side of the pregrooves is 30–90° relative to a plane of the substrate and the buffering layer has 10–50,000 Pa.S melt-viscosity at 140° C., and wherein the angle (Θ) of the slant side of the pregrooves is 50–90° relative to a plane of the substrate.

20. The optical recording medium comprising:
   a substrate having pregrooves;
   a metal recording layer;
   a buffering layer; and
   a reflecting layer which are sequentially stacked on the substrate,
   wherein the angle (θ) of the slant side of the pregrooves is near 90° relative to a plane of the substrate and the buffering layer has 10–50,000 Pa.S melt-viscosity at 140° C.

21. The optical recording medium of claim 17, wherein the reflectivity of the optical recording medium increases after recording.

* * * * *